Nov. 10, 1959  W. W. McMULLEN  2,911,693
SPRING CLIP FASTENER

Original Filed April 8, 1953  2 Sheets-Sheet 1

INVENTOR
Wesley W. McMullen
BY
L. D. Burch
ATTORNEY

Nov. 10, 1959 W. W. McMULLEN 2,911,693
SPRING CLIP FASTENER

Original Filed April 8, 1953 2 Sheets-Sheet 2

INVENTOR
Wesley W. McMullen
BY
L. D. Burch
ATTORNEY

United States Patent Office 2,911,693
Patented Nov. 10, 1959

2,911,693

SPRING CLIP FASTENER

Wesley W. McMullen, Flint, Mich., assignor to General Motors Corporation, Detroit, Mich., a corporation of Delaware Original application April 8, 1953, Serial No. 347,554, now Patent No. 2,779,431, dated January 29, 1957. Divided and this application September 30, 1955, Serial No. 537,734

1 Claim. (Cl. 24—73)

This is a division of application Serial No. 347,554, now Patent Number 2,779,431, entitled "Filtering Device," in the name of Joseph N. Heller and Wesley W. McMullen, filed April 8, 1953. The invention herein relates to fastener means generally and more particularly to means for removably securing one member relative to another.

Devices which are subject to unusually severe operating conditions and which include removable parts, require fastening means which will securely retain the removable parts against accidental withdrawal and yet will permit easy removal and replacement when desired.

In air cleaners, for example those used with earth moving, construction, farm, military and other heavy-duty equipment, and which include a removable filter cartridge required to be frequently replaced on the job, it is desirable to have means for securely retaining the filter cartridge within the cleaner which will also permit rapid and easy removal and replacement of the cartridge member when required.

It is here proposed to provide fastening means which will serve the aforementioned general purpose and also the specific purpose with regard to removable filter cartridges used with air cleaner assemblies.

Figure 1:
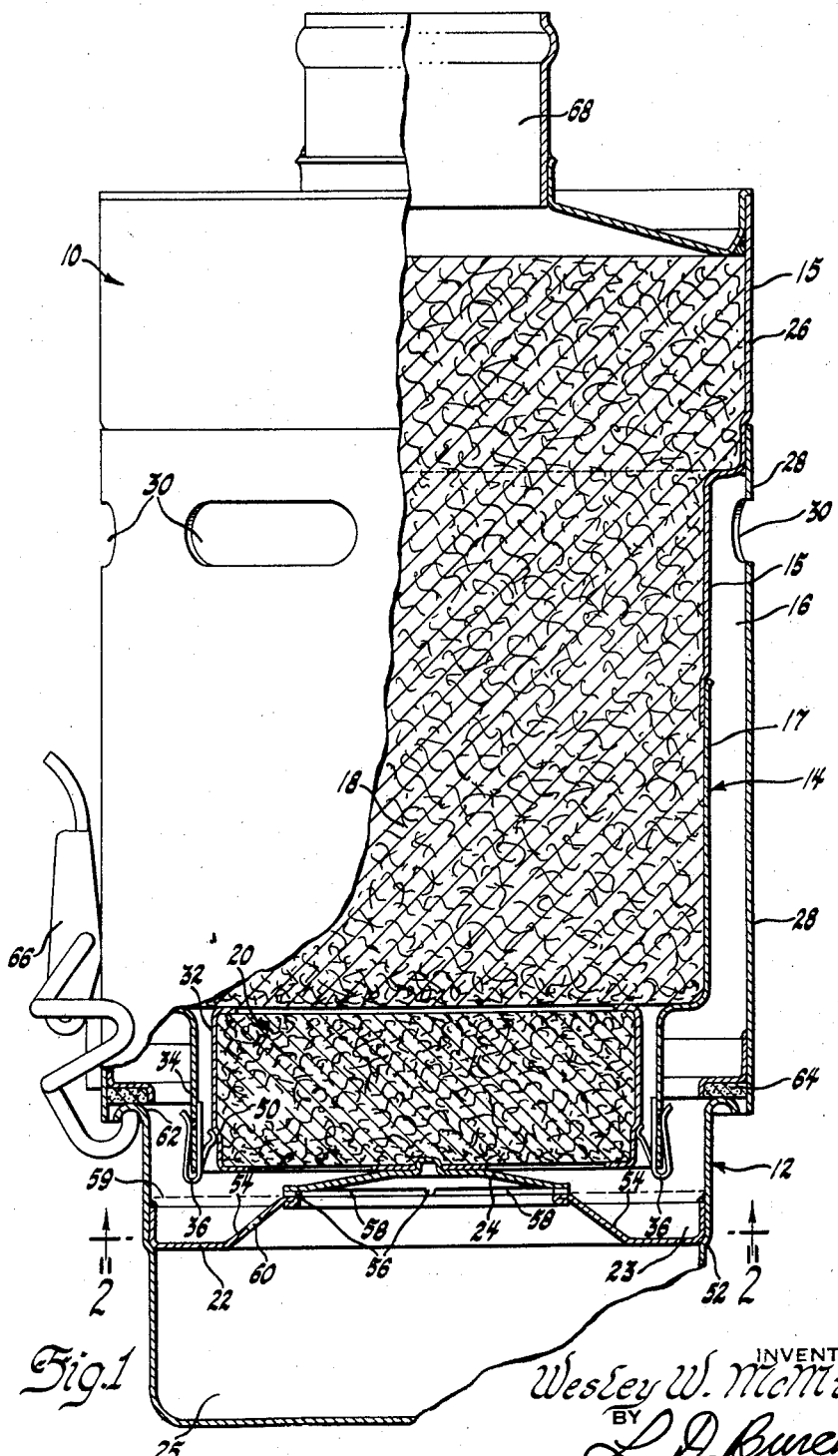
Figure 1 is a side elevational view of an air cleaner partially broken away and cross-sectioned to more clearly show the removable filter element and the baffling and fastening means embracing the invention.
Figure 2:
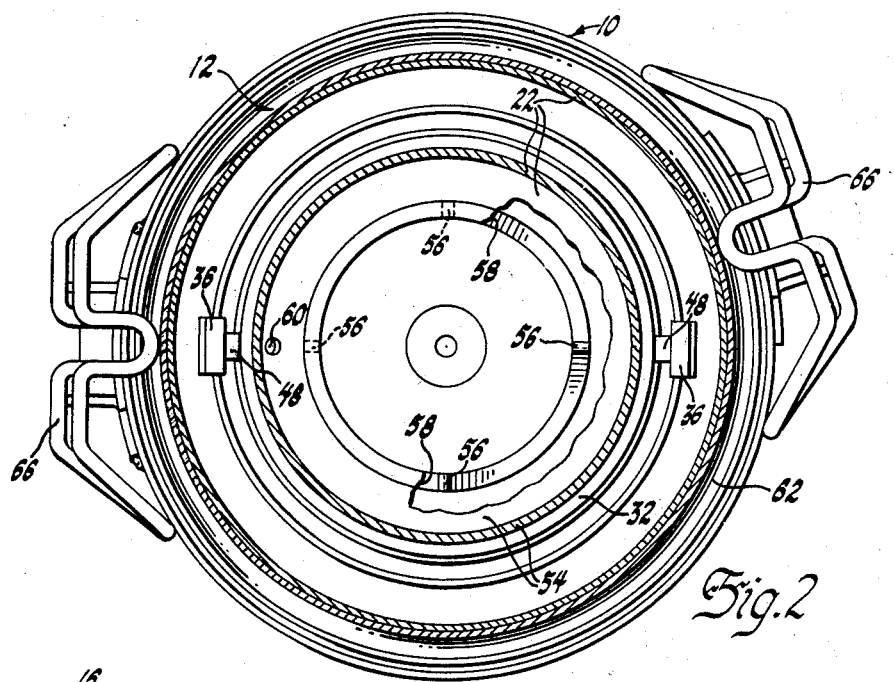
Figure 2 is a cross-sectional view of the air cleaner as taken in the plane of line 2—2 of Figure 1, viewed in the direction of the arrows thereon.
Figure 3:
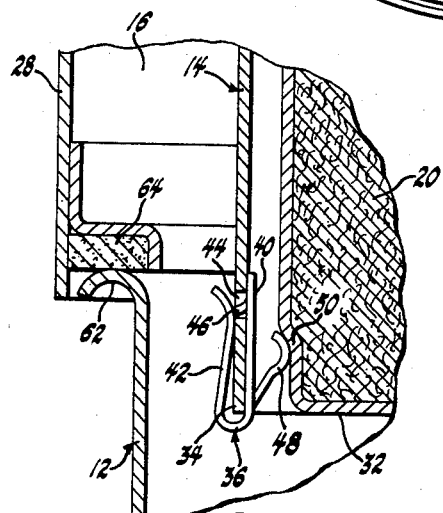
Figure 3 is an enlarged fragmentary view of the air cleaner showing in more detail the means employed for removably securing the filter element within the air cleaner.
Figure 4:
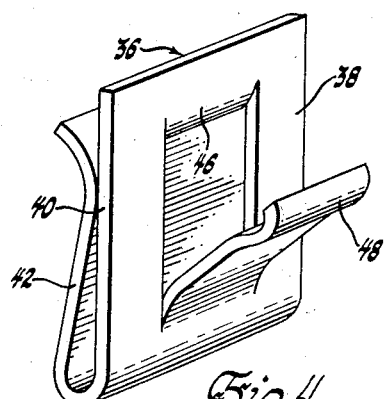
Figure 4 is a perspective view of the fastener adapted to be secured to the air cleaner for removably securing the filter element therein.

The air cleaner in the accompanying drawings includes a filter housing 10 formed by a cylindrical shell 28 disposed about and secured to a sleeve 14 which in the present instance and for the convenience of manufacture is made of sections 15 and 17. The sleeve 14 is enlarged at one end 26 to form part of the housing and the remainder of the sleeve is spaced inwardly from the cylindrical shell 28 to form an annular inlet passage 16. The annular passage 16 communicates with a plurality of openings 30 formed through the cylindrical shell 28 to provide for the induction of air into the passage and through the filter housing.

The sleeve 14 of the filter housing 10 has filter elements 18 and 20 positioned therein adjacent one another. The filter element 18 is formed of material loosely wound or collected to form a filter body disposed within the sleeve 14 near the upper end thereof. The other filter element 20 is formed as a filter cartridge 32 adapted to be removably secured within the lower end of the sleeve 14.

Spring fasteners or resilient elements 36 are adapted to be secured to the sleeve 14 to removably secure the cartridge 32 within the sleeve. The fasteners 36 are formed from spring plate members 38 reversely bent to provide two substantially parallel legs 40 and 42 adapted to receive and engage the end 34 of the sleeve 14. Apertures 44 are formed through the sleeve 14 at positions around the sleeve where the fasteners are to be secured. Tabs 46 are struck from the legs 40 of the fasteners toward the legs 42 and are extended through the apertures 44 in the sleeve to secure the fasteners thereto. Tongues 48 also are struck from the legs 40 in such a way as to extend into the sleeve 14. Tongues 48 engage an annular shoulder 50 formed about the cartridge 32 to secure the cartridge in removable position within the sleeve 14.

The air cleaner also includes a liquid container 12 adapted to be fastened to the filter housing 10 adjacent the end 34 of the sleeve 14 and in spaced relation to the cartridge 32. Although any suitable fastening means may be used to hold the liquid container 12 in engagement with the filter housing 10, in this instance toggle clamps 66 are adapted to engage an outwardly turned flange 62 formed on the liquid container 12 and to hold the flange in engagement with an annular gasket 64 secured within the housing 10. The liquid container 12 is formed to provide an inwardly projecting shoulder 52 on which a baffle plate 22 is mounted. The baffle plate 22 is formed to provide an annular pan 23 about the liquid container 12 which slopes upwardly at its inner edge towards the filter cartridge 32 as is indicated at 54.

A baffle disc 24 is centrally secured to the filter cartridge 32 and is sloped downwardly and outwardly therefrom toward the inner edge of the baffle plate 22. A plurality of spaced projections 56 are formed on the outer edge of the baffle disc 24 and are adapted to engage the flanged inner edge of the baffle plate 22 to provide a plurality of outlet openings 58 between the baffles and to support the filter cartridge 32 and baffle disc 24 in spaced relation to the baffle plate.

The liquid container 12 is formed to provide a sump 25 adapted to contain a liquid at a level 59. The liquid covers the baffle plate 22 and is adapted to flow through an aperture 60 formed in the baffle plate to fill the annular pan 23.

Assuming that the liquid container 12 is removed and that the filter element 18 is disposed within the filter housing 10, the cleaner is assembled by securing the fasteners 36 to the end 34 of the sleeve 14 and by placing the cartridge 32 within the sleeve in engagement with the fasteners. The liquid container 12 is then filled with liquid and positioned against the filter housing 10 in such a way that the baffle plate 22 engages the baffle disc 24 and the flange 62 of the container 12 engages the gasket 64 of the filter housing 10. The fasteners 36, cartridge 32, and baffles 22 and 24 are held in secure engagement against excessive shocks and vibrations which normally tend to cause rattling and disassembly by means of toggle clamps 66 firmly securing the liquid container 12 to the filter housing 10.

The air cleaner is adapted to be installed on an engine or other apparatus by connecting the air outlet opening 68 formed through the filter housing 10 to the air intake side of such apparatus. Air enters the intake openings 30 of the air cleaner and flows into the inlet passage 16, then downwardly against the pan 23 and upwardly into the filter elements 20 and 18 housed in the sleeve 14. The air traveling through the inlet passage 16 strikes the liquid filled pan 23 and deposits in the liquid some of the dirt and foreign matter carried in the air. The force of the air also causes the liquid in the pan 23 to flow up the sloping portion 54 of the baffle plate 22 and to strike the baffle disc 24. The baffle disc 24 directs the liquid and dirt through the outlet openings 58 formed between the baffles 22 and 24 and into the liquid sump 25. The dirt and foreign matter in the liquid settles to the bottom of the sump 25 allowing the cleaner liquid to flow through the aperture 60 and into the pan 23. The air directed upwardly from the liquid filled pan 23 carries some liquid into the filter elements 20 and 18 where the remainder of the dirt and the entrained liquid are separated out. The liquid collected in the filter elements 20 and 18 returns by gravity through filter elements and flows across the baffle disc 24 carrying dirt and foreign matter through the openings 58 and into the liquid sump 25.

Continuous operation and use of the air cleaner causes the filter element 20 to become filled with dirt and necessitates cleaning or replacing the cartridge 32. The toggle clamps 66 then may be released to allow the liquid container 12 to be removed and the filter cartridge 32 to be pulled from the sleeve 14 and replaced by a cleaner cartridge, after which the liquid container 12 is refastened to the filter housing 10.

The claim:

A fastener device for resiliently securing two spaced and substantially parallel members together comprising a reversely bent spring metal strap having first and second legs extending in the same direction and disposed on opposite sides of one of said parallel members and yieldably biased toward each other, said first leg being disposed between said parallel members and said second leg being disposed on the opposite side of said one member from said first leg, a tab and a tongue formed from said first leg and bent in opposite directions out of the plane thereof to provide a single opening through said first leg and said tab being at one end of said opening and said tongue at the other end thereof, said tab extending toward said second leg and provided with a deformation engageable with a corresponding deformation on said one parallel member disposed between said first and second legs and said tongue extending toward the other of said substantially parallel members for engagement therewith, and said second leg having a continuous uninterrupted surface to frictionally engage one side of said one member disposed between said legs and retain said fastener device thereon.

References Cited in the file of this patent

UNITED STATES PATENTS

| | | |
|---|---|---|
| 642,442 | Goff | Jan. 30, 1900 |
| 2,115,312 | Lombard | Apr. 26, 1938 |
| 2,295,444 | Woodward | Sept. 8, 1942 |

FOREIGN PATENTS

| | | |
|---|---|---|
| 990,931 | France | June 13, 1951 |
| 1,027,430 | France | Feb. 18, 1953 |